(12) United States Patent
Kim et al.

(10) Patent No.: US 8,301,182 B2
(45) Date of Patent: Oct. 30, 2012

(54) CLUSTER-BASED COOPERATIVE COMMUNICATION SYSTEM AND METHOD

(75) Inventors: Eun Yong Kim, Hwaseong-si (KR); Yu Seok Kim, Seoul (KR); Yung Soo Kim, Seongnam-si (KR); Eun Seok Ko, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 12/629,777

(22) Filed: Dec. 2, 2009

(65) Prior Publication Data

US 2010/0136994 A1   Jun. 3, 2010

(30) Foreign Application Priority Data

Dec. 2, 2008   (KR) .................. 10-2008-0120978

(51) Int. Cl.
*H04W 72/00* (2009.01)
*H04W 4/00* (2009.01)
*H04B 7/00* (2006.01)

(52) U.S. Cl. ............... 455/509; 455/450; 455/452.2; 455/524; 370/328; 370/329

(58) Field of Classification Search .......... 455/450, 455/452.1, 500, 502, 509, 513, 522, 524, 455/63.1; 370/328, 329, 338, 350, 410
See application file for complete search history.

(56) References Cited

U.S. PATENT DOCUMENTS

| | | |
|---|---|---|
| 2003/0114196 A1 | 6/2003 | Chitrapu |
| 2007/0248172 A1 | 10/2007 | Mehta et al. |
| 2007/0270168 A1 | 11/2007 | Sheynblat |
| 2007/0280175 A1* | 12/2007 | Cheng et al. .............. 370/338 |
| 2009/0312027 A1* | 12/2009 | Foschini et al. ............ 455/446 |
| 2010/0034151 A1* | 2/2010 | Alexiou et al. ............ 370/329 |
| 2010/0042716 A1* | 2/2010 | Farajidana et al. ......... 709/224 |

\* cited by examiner

*Primary Examiner* — Wesley Kim
(74) *Attorney, Agent, or Firm* — Jefferson IP Law, LLP

(57) ABSTRACT

A cluster-based cooperative communication system and method is provided for mitigating inter-cell interference effectively. A cluster-based cooperative communication method of a mobile station includes receiving allocation of a resource of a weighted subband mapped to one of preset cooperative base station clusters, the selected cooperative base station cluster having a group including a serving base station of the mobile station and dominant interfering base stations found by channel estimation, and communicating with the serving base station in cooperation with the dominant interfering base stations.

8 Claims, 13 Drawing Sheets

(Related Art)

CLUSTER A

CLUSTER B

CLUSTER C

CLUSTER D

CLUSTER E

FIRST CLUSTER

SECOND CLUSTER

CLUSTER A

CLUSTER B

CLUSTER C

CLUSTER D

CLUSTER-BASED COOPERATIVE COMMUNICATION SYSTEM AND METHOD

PRIORITY

This application claims the benefit under 35 U.S.C. §119(a) of a Korean Patent application filed in the Korean Intellectual Property Office on Dec. 2, 2008 and assigned Serial No. 10-2008-0120978, the entire disclosure of which are hereby incorporated by reference.

BACKGROUND OF THE INVENTION

1. Field of the Invention

The present invention relates to wireless communications. More particularly, the present invention relates to a cluster-based cooperative communication system and method for mitigating inter-cell interference effectively.

2. Description of the Related Art

Inter-cell interference is a significant problem to be addressed in a Multiple Input Multiple Output (MIMO) communication system. Recently, research has been conducted on a cooperative base station system for more actively mitigating the inter-cell interference. Pre-coding Matrix Index (PMI) restriction (or PMI recommendation) is known as an efficient technique for compressing an amount of overhead incurred in the cooperative base station system.

FIG. 1 is a schematic diagram illustrating a conventional cooperative base station system.

In FIG. 1, the cooperative base station system includes a first base station 111 defining a cell 121, a second base station 211 defining a cell 221, a first mobile station 101, and a second mobile station 201. The first mobile station 101 is located at a cell boundary area where signal strength from each of the first and second base stations 111 and 211 is weak, and the second mobile station 201 is located in the cell 221 of the second base station 211.

In this case, a signal transmitted from the second base station 211 to the second mobile station 201 is likely to strongly influence the first mobile station 101. More particularly, when the first and second mobile stations 101 and 201 are allocated the same time-frequency resource, the signal from the second base station 211 to the second mobile station 201 must be a dominant interference to the first mobile station 101. Accordingly, in a wireless communication system of which frequency reuse factor is 1, the performance of a mobile station is significantly degraded at a cell edge.

The PMI restriction is a method to address the aforementioned problem in the MIMO communication system. The first mobile station 101 estimates downlink channels of the first and second base stations 111 and 211, calculates the pre-coding matrix (or vector) of the second base station 211 which is potentially interfering with the first mobile station 101, and reports the Pre-coding Matrix Index (PMI) to the first base station 111. The first base station 111 sends the PMI to the second base station 211 such that the second base station 211 restricts the use of the PMI informed by the first base station 111.

The PMI restriction process is advantageous in mitigating the inter-cell interference to the cell edge mobile station. However, its performance is limited so as to control the interference from a single cell. Although it can be considered to propose an extended PMI restriction technique, the extended PMI restriction technique is also limited in performance to a preset number of cells.

Since cells in a cellular system cannot be completely isolated from each other and must coexist, they naturally interfere with each other. Furthermore, each cell can be divided into sectors such that it is rare for a mobile station to be placed in a situation in which it must consider only one or two cells (or sector), whereby it is difficult to expect sufficient inter-cell interference mitigation performance of the PMI restriction technique limited in number of neighbor cells. This means that if a base station fails to cooperate with a neighbor base station as a potentially dominant inter-cell interference source, then a minimal inter-cell interference mitigation effect can be expected. In a cellular system in which cooperative base station groups are preset, there exists an overlapping area between the base station groups, and thus the mobile station located at the overlapping area does not benefit from the cooperative base station system.

SUMMARY OF THE INVENTION

An aspect of the present invention is to address at least the above-mentioned problems and/or disadvantages and to provide at least the advantages described below. Accordingly, an aspect of the present invention is to provide a cluster-based cooperative communication system and method that is capable of maximizing inter-cell interference mitigation effect by estimating the dominantly interfering neighbor cells or sectors accurately.

In accordance with an aspect of the present invention, a cluster-based cooperative communication method of a mobile station is provided. The method includes receiving allocation of a resource of a weighted subband mapped to one of preset cooperative base station clusters, the selected cooperative base station cluster having a group including a serving base station of the mobile station and dominant interfering base stations found by channel estimation, and communicating with the serving base station in cooperation with the dominant interfering base stations.

In an exemplary implementation, receiving allocation includes selecting, at the serving base station, the cooperative base station cluster having the group including the serving base station and the dominant interfering base stations, and allocating the resource by weighting the subband mapped to the selected cooperative base station cluster.

In an exemplary implementation, receiving allocation includes reporting the cooperative base station cluster having the group including the serving base station and the dominant interfering base stations from the mobile station to the serving base station, and allocating, at the serving base station, the resource by weighting the subband mapped to the selected cooperative base station cluster to the mobile station.

In accordance with another aspect of the present invention, a cluster-based cooperative communication method of a base station is provided. The method includes allocating a resource of a weighted subband mapped to one of preset cooperative base station clusters to a mobile station, the selected cooperative base station cluster having a group including a serving base station of the mobile station and dominant interfering base stations found by channel estimation, and communicating with the mobile station in cooperation with the dominant interfering base stations.

In an exemplary implementation, allocating a resource includes selecting the cooperative base station cluster having the group including the serving base station and the dominant interfering base stations, and allocating the resource by weighting the subband mapped to the selected cooperative base station cluster.

In an exemplary implementation, allocating a resource includes reporting the cooperative base station cluster having the group including the serving base station and the dominant interfering base stations from the mobile station to the serving base station, and allocating the resource by weighting the subband mapped to the selected cooperative base station cluster to the mobile station.

In accordance with yet another aspect of the present invention, a cluster-based cooperative communication system is provided. The system includes a mobile station for receiving allocation of a resource of a weighted subband mapped to one of preset cooperative base station clusters, the selected cooperative base station cluster having a group including a serving base station of the mobile station and dominant interfering base stations found by channel estimation, and communicating with the serving base station in cooperation with the dominant interfering base stations.

In an exemplary implementation, the serving base station selects the cooperative base station cluster having the group including the serving base station and the dominant interfering base stations and allocates the resource by weighting the subband mapped to the selected cooperative base station cluster.

In an exemplary implementation, the mobile station reports the cooperative base station cluster having the group including the serving base station and the dominant interfering base stations from the mobile station to the serving base station, and the base station allocates the resource by weighting the subband mapped to the selected cooperative base station cluster to the mobile station.

In accordance with still another aspect of the present invention, a cluster-based cooperative communication system is provided. The system includes a serving base station for allocating a resource of a weighted subband mapped to one of preset cooperative base station clusters to a mobile station, the selected cooperative base station cluster having a group including a serving base station of the mobile station and dominant interfering base stations found by channel estimation, and communicating with the mobile station in cooperation with the dominant interfering base stations.

In an exemplary implementation, the serving base station selects the cooperative base station cluster having the group including the serving base station and the dominant interfering base stations and allocates the resource by weighting the subband mapped to the selected cooperative base station cluster.

In an exemplary implementation, the mobile station reports the cooperative base station cluster having the group including the serving base station and the dominant interfering base stations from the mobile station to the serving base station, and the serving base station allocates the resource by weighting the subband mapped to the selected cooperative base station cluster to the mobile station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, an arrangement of cells for explaining the principle of cluster-based cooperative communication system according to an exemplary embodiment of the present invention is described.

Figure 1:
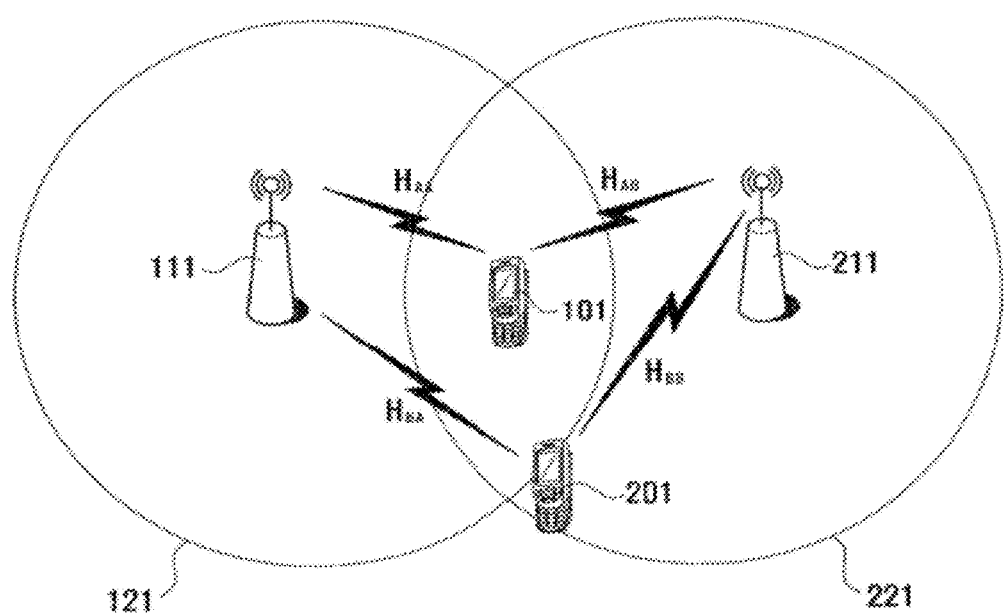
FIG. 1 is a schematic diagram illustrating a conventional cooperative base station.
Figure 2:
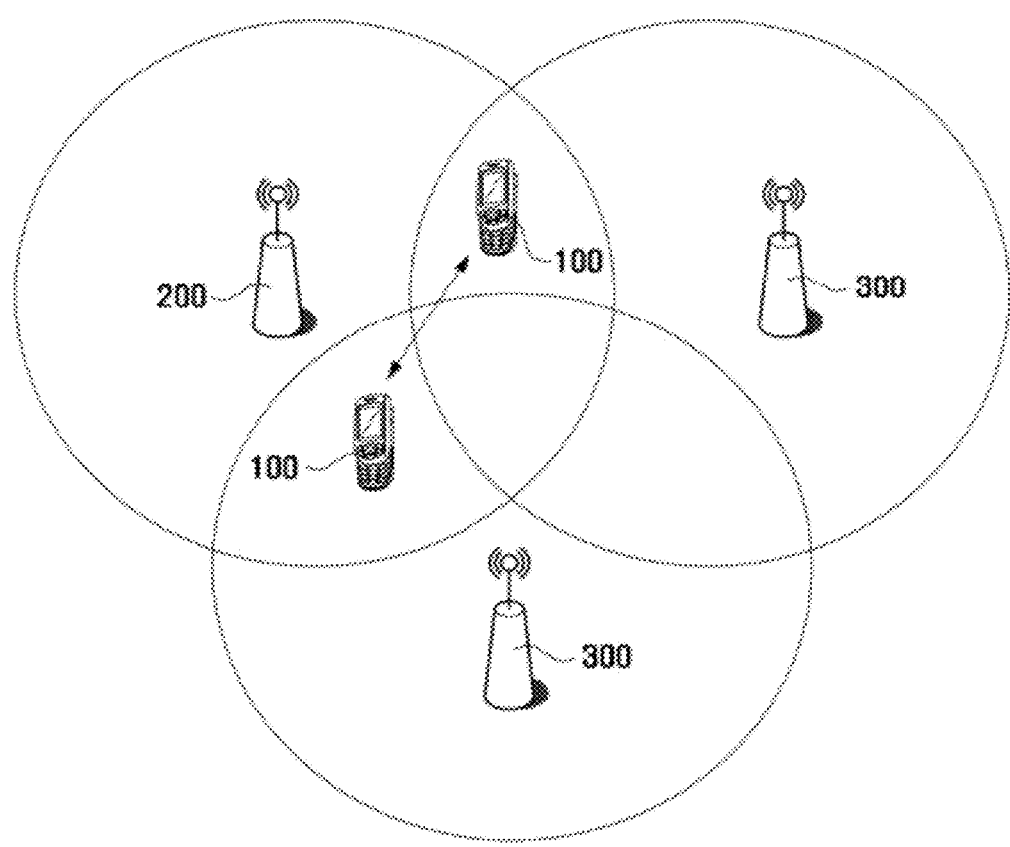
FIG. 2 is a schematic diagram illustrating a cluster-based cooperative communication system according to an exemplary embodiment of the present invention.

FIG. 2 is a schematic diagram illustrating a cluster-based cooperative communication system according to an exemplary embodiment of the present invention.

Referring to FIG. 2, a cluster-based cooperative communication system according to an exemplary embodiment of the present invention includes a mobile station 100, a serving base station 200 of the mobile station 100, and cooperative base stations 300 cooperating with the serving base station 200. The number of cooperative base stations 300 may be changed. One of the cooperative base stations 300 can be the dominant interfering base station. In an exemplary embodiment of the present invention, the serving base station 200 and the cooperative base stations 300 are grouped into a cooperative base station group (or just "group") to mitigate the interference effectively.

In order to designate the dominant interfering base station as a cooperative base station, a plurality of cooperative base station are formed as a cooperative base station cluster (or just "cluster"). Each cooperative base station cluster is a set of potentially dominant interfering base stations. In an exemplary embodiment of the present invention, the mobile station 100 or the serving base station 200 selects a cooperative base station cluster which includes the dominant interfering base station to the mobile station 100 and the serving base station 200 so as to maximize the interference mitigation efficiency.

A cluster-based cooperative communication system according to an exemplary embodiment of the present invention is described hereinafter in detail.

Figure 3:
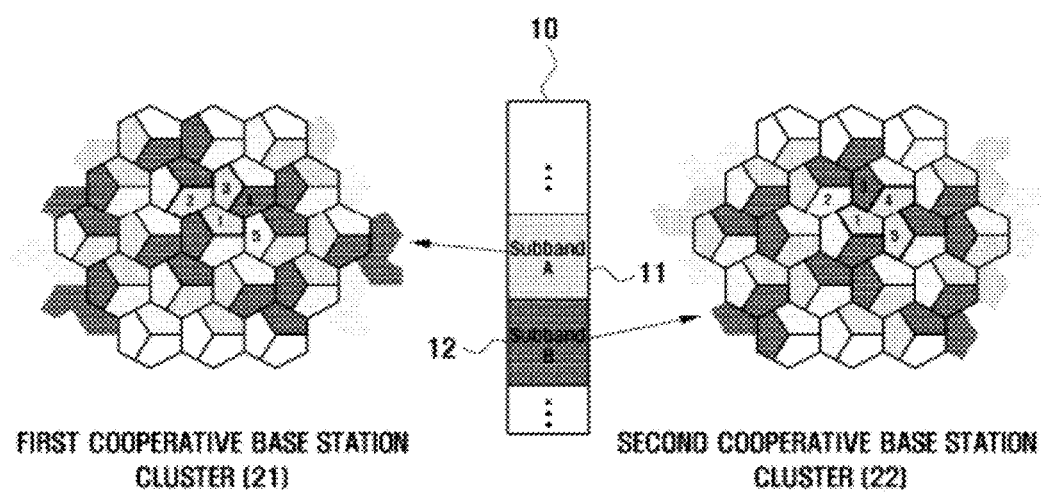
FIG. 3 is a diagram illustrating a principle of a cooperative communication system according to an exemplary embodiment of the present invention.
Figure 4:
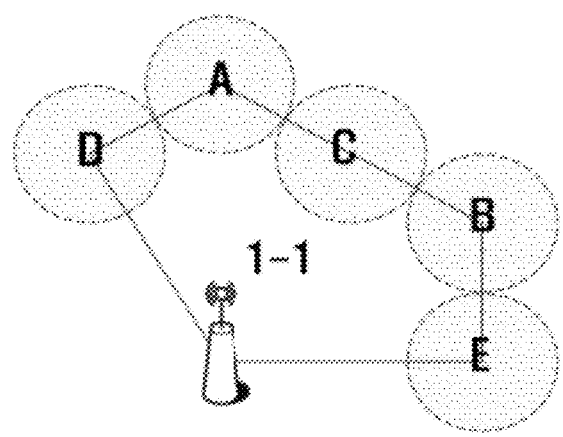
FIG. 4 is a diagram illustrating a sector having edge regions for defining a location of a mobile station for a cluster-based cooperative communication system according to an exemplary embodiment of the present invention.

FIG. 3 is a diagram illustrating a principle of a cooperative communication system according to an exemplary embodiment of the present invention.

Referring to FIG. 3, reference numeral 10 denotes a downlink channel. In an exemplary embodiment of the present invention the downlink channel is divided into a plurality of subbands. The subbands are mapped to the corresponding cooperative base station clusters.

The channel includes a first subband 11 and a second subband 12. The first subband is mapped to a first cooperative base station cluster 21, and the second subband is mapped to a second cooperative base station cluster 22.

A cooperative base station cluster includes a plurality of cooperative base station groups each including two or more cells (sectors). Each cooperative base station group operates with the cooperative base station transmission scheme.

Each of the first and second cooperative base station clusters 21 and 22 is composed with different cooperative base station groups.

For instance, the first cooperative base station cluster 21 includes a first sector 1, a second sector 2, and a second sector 3 from the point of reference of the first sector 1; whereas the second cooperative base station cluster 22 includes the first sector 1, a fourth sector 4, and a fifth sector 5 from the point of reference of the first sector 1.

In this manner, the cooperative base station clusters are mapped to the different subbands distinguishing the downlink frames from each other. Each cooperative base station cluster includes a plurality of groups, and each group includes a plurality of members (cells and/or sectors).

From the point of reference of a member as the serving base station, a group is composed of the members that are dominantly interfering with the mobile station served by the serving base station. The different cooperative base station cluster share a member, and the members of a cooperative base station group can be changed according to the location of the mobile station from the point of reference of the shared member. This is because the dominant interfering sector (or cell) to the mobile station can be changed according to the movement of the mobile station within the serving sector (or cell).

In an exemplary embodiment of the present invention, a cooperative cluster, including the most dominant interfering base station and the serving base station of the mobile station, is selected from among the cooperative base station clusters having different cooperative base station groups and allocates the resources of the corresponding subband so as to improve the interference mitigation efficiency of the cooperative base station transmission scheme.

A principle for configuring a cooperative base station cluster according to an exemplary embodiment of the present invention is described hereinafter in detail.

In an exemplary embodiment of the present invention, a cooperative base station cluster can include both the cells and sectors as its members, and a cooperative base station group includes at least two members. The cooperative base station cluster can be configured in various manners.

FIGS. 4 to 9 are diagrams illustrating available configurations of a cooperative base station cluster for a cluster-based cooperative communication system according to an exemplary embodiment of the present invention.

In FIGS. 4 to 9, each cell is divided into three sectors each assigned a unique Physical Cell ID (PCID), and the base station transmits different signals to the corresponding sectors using directional antennas. However, this configuration is merely for ease of description and not to be considered as limiting. For example, the cell may be divided into a greater number of sectors.

Referring to FIGS. 4 to 9, each cooperative base station cluster includes a plurality of cooperative base station groups. Here, the member of the cooperative base station group is a sector, and the three sectors constitute a cooperative base station group. There exist five cooperative base station clusters, and the five cooperative base station clusters are mapped to corresponding subbands of the downlink channel.

Here, the cooperative BS clusters are configured from the point of reference of the sector 1-1.

Figure 5:
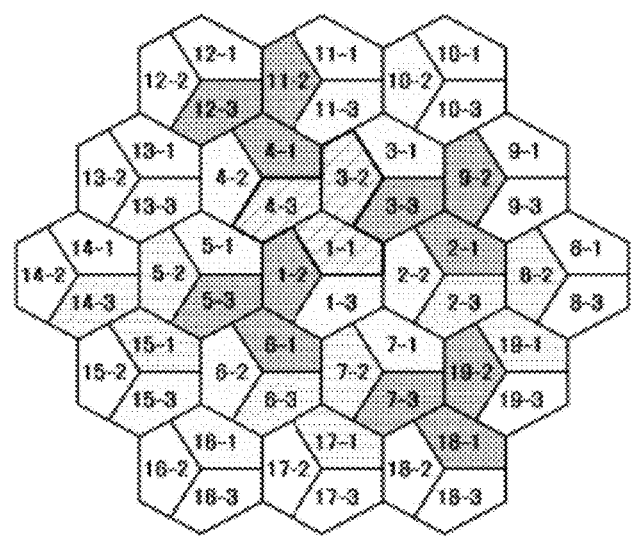
FIG. 5 is a diagram illustrating a configuration of a cooperative base station cluster for a cluster-based cooperative communication system using a sector according to an exemplary embodiment of the present invention.
Figure 6:
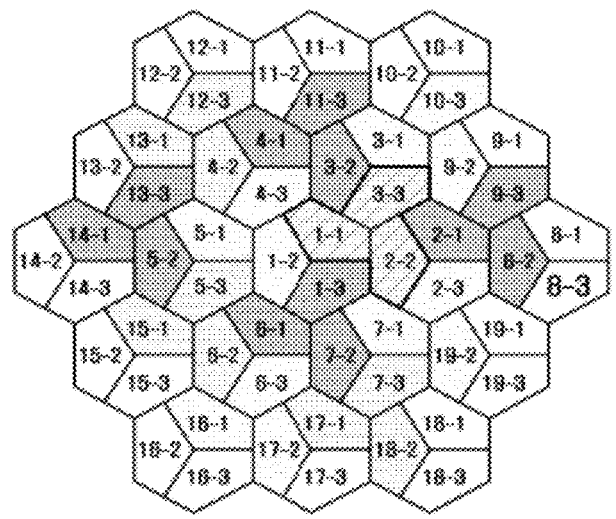
FIG. 6 is a diagram illustrating a configuration of a cooperative base station cluster for a cluster-based cooperative communication system using a sector according to an exemplary embodiment of the present invention.
Figure 7:
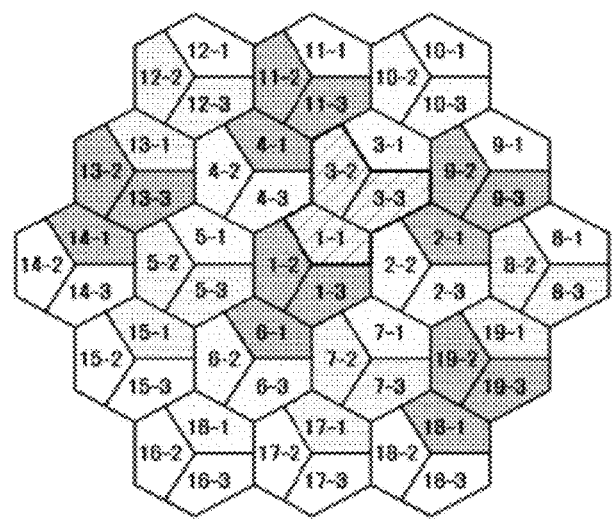
FIG. 7 is a diagram illustrating a configuration of a cooperative base station cluster for a cluster-based cooperative communication system using a sector according to an exemplary embodiment of the present invention.
Figure 8:
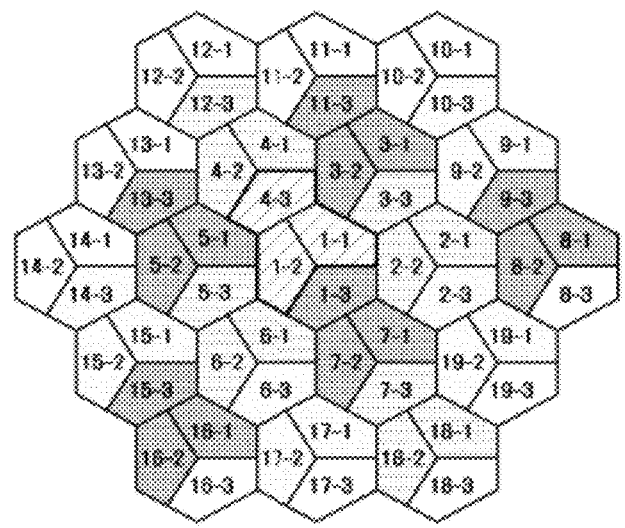
FIG. 8 is a diagram illustrating a configuration of a cooperative base station cluster for a cluster-based cooperative communication system using a sector according to an exemplary embodiment of the present invention.
Figure 9:
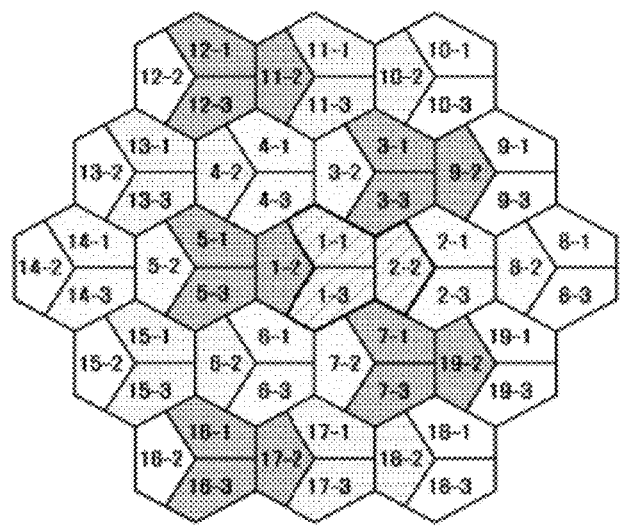
FIG. 9 is a diagram illustrating a configuration of a cooperative base station cluster for a cluster-based cooperative communication system using a sector according to an exemplary embodiment of the present invention.

In FIG. 5, the cluster A includes a group formed with the sector 1-1, a sector 3-2, and a sector 4-3. In FIG. 6, the cluster B includes a group formed with the sector 1-1, a sector 2-2, and a sector 3-3. In FIG. 7, the cluster C includes a group formed with the sector 1-1, a sector 3-2, and the sector 3-3. In FIG. 8, the cluster D includes a group formed with the sector 1-1, and a sector 1-2, and a sector 4-3. In FIG. 9, the cluster E includes a group formed with the sector 1-1, a sector 1-3, and the sector 2-2.

Referring to FIG. 5, if the mobile station is located at region A (see FIG. 4) of the sector 1-1, the sectors 3-2 and 4-3 become the most dominant interfering sectors. In this case, it is preferred to select the cluster A such that the communication is performed in cooperation with the sectors 1-1, 3-2, and 4-3 using the subband mapped to the cluster A, thereby effectively mitigating the interference to the mobile station.

Referring to FIG. 6, if the mobile station is located at region B (see FIG. 4) of the sector 1-1, the sectors 2-2 and 3-3 become the most dominant interfering sectors. In this case, it is preferred to select the cluster B such that the communication is performed in cooperation with the sectors 1-1, 2-2, and 3-3 using the subband mapped to the cluster B, thereby effectively mitigating the interference to the mobile station.

Referring to FIG. 7, if the mobile station is located at region C (see FIG. 4) of the sector 1-1, the sectors 3-2 and 3-3 become the most dominant interfering sectors. In this case, it is preferred to select the cluster B such that the communication is performed in cooperation with the sectors 1-1, 3-2, and 3-3 using the subband mapped to the cluster C, thereby effectively mitigating the interference to the mobile station.

Referring to FIG. 8, if the mobile station is located at region D (see FIG. 4) of the sector 1-1, the sectors 1-2 and 4-3 become the most dominant interfering sectors. In this case, it is preferred to select the cluster D such that the communication is performed in cooperation with the sectors 1-1, 1-2, and 4-3 using the subband mapped to the cluster D, thereby effectively mitigating the interference to the mobile station.

Referring to FIG. 9, if the mobile station is located at region E (see FIG. 4) of the sector 1-1, the sectors 1-3 and 2-2 become the most dominant interfering sectors. In this case, it is preferred to select the cluster E such that the communication is performed in cooperation with the sectors 1-1, 1-3, and 2-2 using the subband mapped to the cluster E, thereby effectively mitigating the interference to the mobile station.

A cluster-based cooperative communication system according to an exemplary embodiment of the present invention is described hereinafter in detail.

Figure 10:
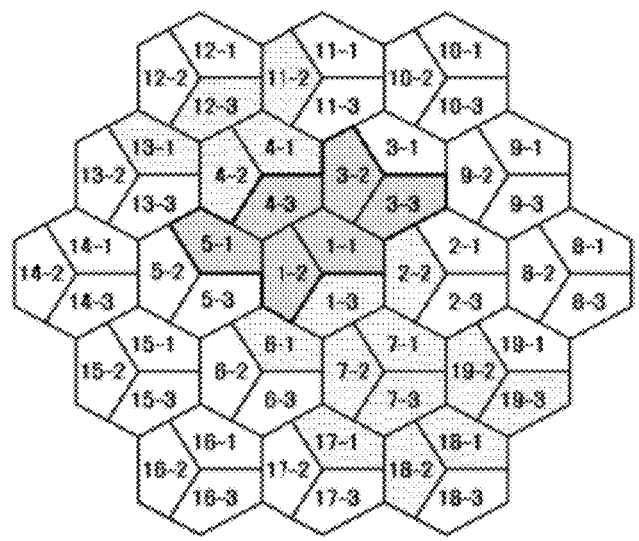
FIG. 10 is a diagram illustrating a configuration of a cooperative base station cluster for a cluster-based cooperative communication system using a sector according to an exemplary embodiment of the present invention.
Figure 11:
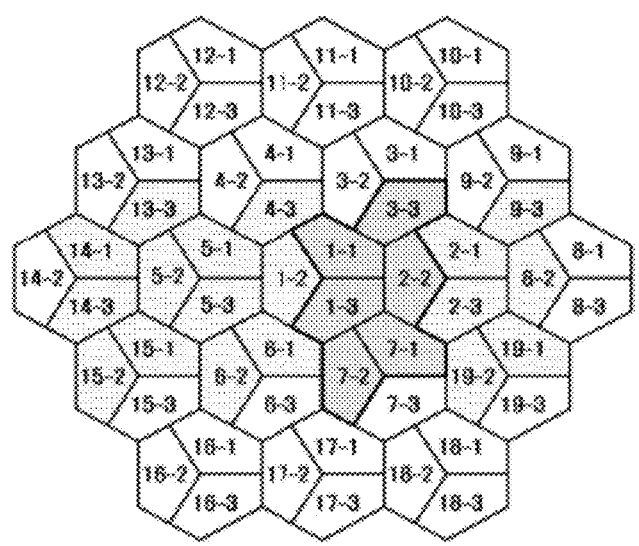
FIG. 11 is a diagram illustrating a configuration of a cooperative base station cluster for a cluster-based cooperative communication system according to an exemplary embodiment of the present invention.

FIGS. 10 and 11 are diagrams illustrating a design principle of cooperative base station clusters for a cluster-based cooperative communication system according to an exemplary embodiment of the present invention.

Referring to FIGS. 10 and 11, each cell is divided into three sectors, and the base station transmits different signal to the corresponding sectors using directional antennas. More particularly, in the exemplary embodiment of FIGS. 10 and 11, each cooperative base station cluster includes a plurality of cooperative base station groups, and a cooperative base station group is composed of 6 sectors.

In FIG. 10, the first cluster includes a group formed with the sectors 1-1, 1-2, 3-2, 3-3, 4-3, and 5-1. In FIG. 11, the second cluster includes a group formed with the sectors 1-1, 1-3, 2-2, 3-3, 7-1, and 7-1. In an exemplary embodiment of the present invention, a group can be composed of two or more members, and a cluster can be composed a plurality of groups.

The cooperative base station cluster can be configured in various manners.

FIGS. 12 to 16 are diagrams illustrating available configurations of a cooperative base station cluster for a cluster-based cooperative communication system according to an exemplary embodiment of the present invention.

Referring to FIGS. 12 to 16, a cooperative base station cluster includes a plurality of cell groups, and each group is composed of four cells. There can exist four clusters A, B, C, and D that are mapped to four different subbands of the downlink channel.

Here, the cooperative base station clusters are configured from the point of reference of the cell 1.

Figure 13:
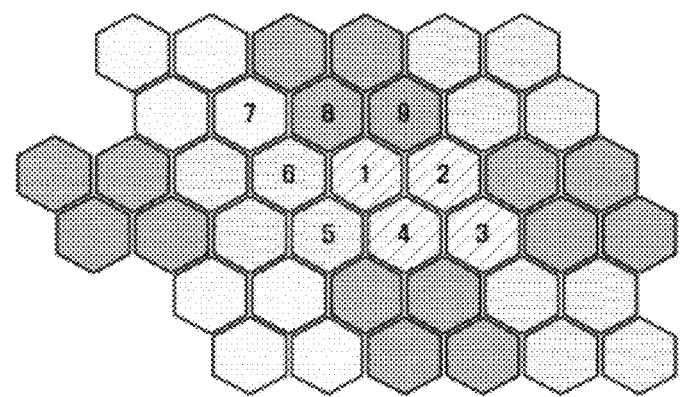
FIG. 13 is a diagram illustrating a configuration of a cooperative base station cluster for a cluster-based cooperative communication system using a cell according to an exemplary embodiment of the present invention.
Figure 14:
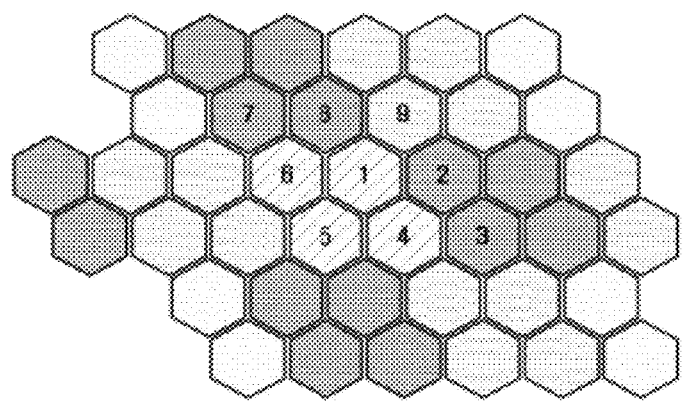
FIG. 14 is a diagram illustrating a configuration of a cooperative base station cluster for a cluster-based cooperative communication system using a cell according to an exemplary embodiment of the present invention.
Figure 15:
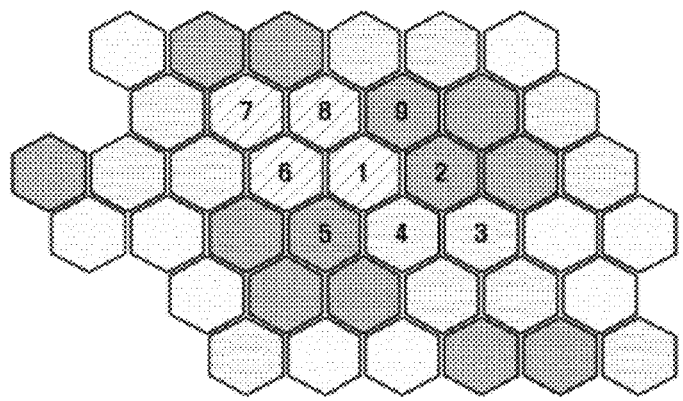
FIG. 15 is a diagram illustrating a configuration of a cooperative base station cluster for a cluster-based cooperative communication system using a cell according to an exemplary embodiment of the present invention.
Figure 16:
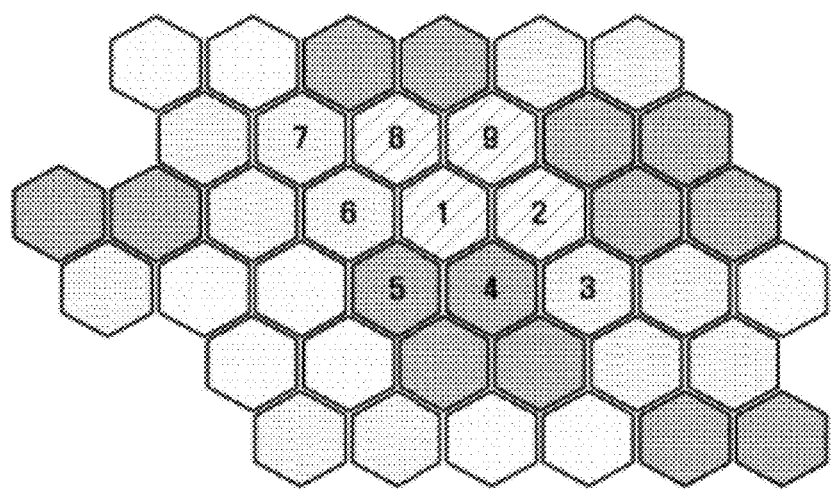
FIG. 16 is a diagram illustrating a configuration of a cooperative base station cluster for a cluster-based cooperative communication system using a cell according to an exemplary embodiment of the present invention.

The cluster A includes a group formed with the cells 1, 2, 3, and 4 as shown in FIG. 13. The cluster B includes a group formed with the cells 1, 4, 5, and 6 as shown in FIG. 14. The cluster C includes a group form with the cells 1, 6, 7, and 8 as shown in FIG. 15. And the cluster D includes a group formed with the cells 1, 2, 8, 9 as shown in FIG. 16.

Figure 12:
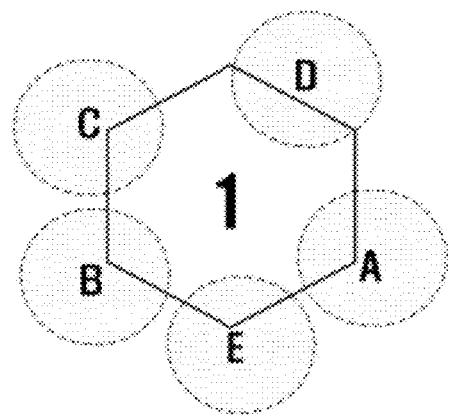
FIG. 12 is a diagram illustrating a cell having edge regions for defining a location of a mobile station for a cluster-based cooperative communication system according to an exemplary embodiment of the present invention.

Referring to FIGS. 12 and 13, if the mobile station is located at region A of the cell 1, the cells 2 and 4 become the most dominant interfering cells. In this case, it is preferred to select the cluster A having the cooperative base station group including the cells 1, 2, 3, and 4 such that the communication is performed in cooperation with the cells 1, 2, 3, and 4 using the subband mapped to the cluster A, thereby effectively mitigating the interference to the mobile station.

Referring to FIGS. 12 and 14, if the mobile station is located at region B of the cell 1, the cells 5 and 6 become the most dominant interfering cells. In this case, it is preferred to select the cluster B having the cooperative base station group including the cells 1, 4, 5, and 6 such that the communication is performed in cooperation with the cells 1, 4, 5, and 6 using the subband mapped to the cluster B, thereby effectively mitigating the interference to the mobile station.

Referring to FIGS. 12 and 15, if the mobile station is located at region C of the cell 1, the cells 6 and 8 become the most dominant interfering cells. In this case, it is preferred to select the cluster C having the cooperative base station group including the cells 1, 6, 7, and 8 such that the communication is performed in cooperation with the cells 1, 6, 7, and 8 using the subband mapped to the cluster C, thereby effectively mitigating the interference to the mobile station.

Referring to FIGS. 12 and 16, if the mobile station is located at region D of the cell 1, the cells 2, 8, and 9 become the most dominant interfering cells. In this case, it is preferred to select the cluster D having the cooperative base station group including the cell 1, 2, 8, and 9 such that the communication is performed in cooperation with the cells 1, 2, 8, and 9 using the subband mapped to the cluster D, thereby effectively mitigating the interference to the mobile station.

If the mobile station is located at region E, the cells 4 and 5 become the most dominant interference cells. Accordingly, it is preferred to select the cluster B having the cooperative base station group including the cells 1, 4, 5, and 6 such that the communication is performed in cooperation with the cells 1, 4, 5, and 6 using the subband mapped to the cluster B, thereby effectively mitigating the interference to the mobile station.

As described above, the cooperative base station cluster can be configured in various manners, and the different cooperative base station clusters are mapped to the corresponding the subbands differentiating the downlink frames.

In an exemplary embodiment of the present invention, the system selects a cooperative base station cluster including the group having the most dominant interfering member to the mobile station and allocates the resource mapped to the selected cooperative base station cluster to the mobile station, there by maximizing the interference mitigation efficiency.

A cluster-based cooperative communication method according to an exemplary embodiment of the present invention is described hereinafter in detail.

In the cluster-base cooperative communication method according to an exemplary embodiment of the present invention, the system selects a cooperative base station cluster mapped to a subband such that the cells of a group belonged to the selected cooperative base station cluster cooperate with each other for transmission to the mobile station. The selection of a cooperative base station cluster can be performed by the serving base station or the mobile station.

Figure 17:
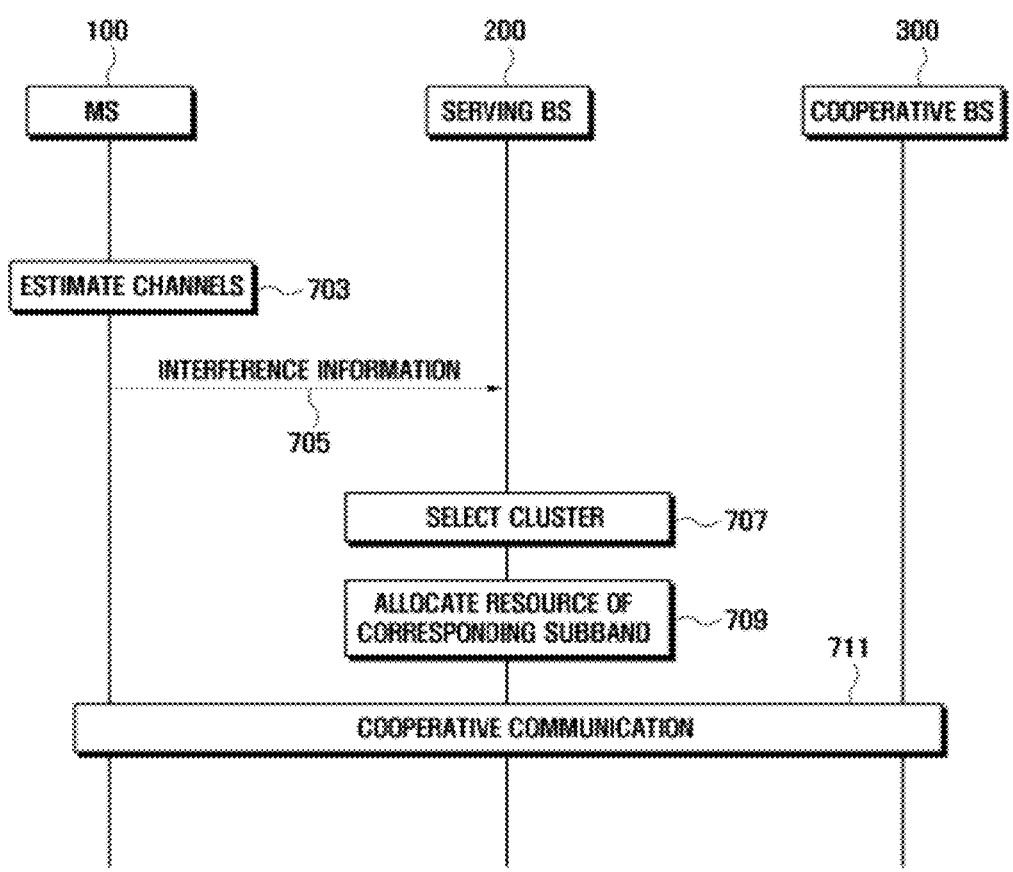
FIG. 17 is a sequence diagram illustrating operations of a mobile terminal and serving and cooperative base stations in a cluster-based cooperative communication system according to an exemplary embodiment of the present invention.

FIG. 17 is a sequence diagram illustrating operations of a mobile terminal and serving and cooperative base stations in a cluster-based cooperative communication system according to an exemplary embodiment of the present invention.

In FIG. 17, it is assumed that the downlink channel is divided into a plurality of subbands, and the subbands are mapped to corresponding cooperative base station clusters. Also, it is assumed that the base stations share the information on the cooperative base station clusters mapped to the respective subbands.

Referring to FIG. 17, a mobile station 100 measures the downlink channels of the neighbor base stations at step 703. Next, the mobile station 100 sends channel condition information and interference information as the result of the measurement to a serving base station 200 at step 705. Here, the interference information can be a list of cells (or sector) sorted in order of interference levels. The interference information can be transmitted along with cooperative communication information mapped thereto.

The cooperative communication information is the information for the serving and neighbor base stations to cooperate the inter-cell interferences and generated in different format depending on the interference mitigation scheme.

Table 1 shows an exemplary format of interference information transmitted by the mobile station.

TABLE 1

| Rank | Cell (or sector) | Cooperative communication info. (PMI restriction) |
|---|---|---|
| 1 | Cell 4 | Index #2 |
| 2 | Cell 5 | Index #3 |
| 3 | Cell 6 | Index #1 |
| 4 | Cell 2 | Index #7 |
| 5 | Cell 3 | Index #4 |

It is assumed that the interference information of table 1 is transmitted and the mobile station is located at the region B of cell 1 in the cluster configurations of FIGS. 12 to 16. As a result of the channel measurements at step 703, the cells are listed in order of cell 4, cell 5, cell 6, cell 2, and cell 3 according to the interfering levels. The mobile station 100 transmits the interference information formatted as shown in table 1 in which the cells are listed in descending order of interfering level to the serving base station 200.

The interference information includes the cooperative communication information about the dominant interfering cells. The cooperative communication information can include at least one of channel measurement values of the neighbor base stations, PMI restriction, PMI recommendation, and subband-off value.

Here, the channel measurement values can be provided in the form of a channel matrix between the mobile station and the neighbor base stations. The PMI restriction is the information for restricting the use of the pre-coding vector of the codebook stored in the neighbor base stations that causes dominant interference to the mobile station. The PMI recommendation is the information for recommending the use of the pre-coding vector of the codebook stored in the neighbor base stations that causes the least interference to the mobile station. The subband off value is a parameter to request a specific base station to not transmit a signal so as to avoid interference. In table 1, the PMI restriction is interference information that includes the PMI restriction. In a case of cell 4, the index #2 indicates the pre-coding matrix vector can be transmitted. If the PMI recommendation scheme is used, the recommended pre-coding matrix vector can be transmitted.

If the interference information is received, the serving base station 200 selects the cooperative base station cluster including the most dominant interfering base station on the interference information at step 707.

In a case where the cooperative base station clusters are configured as shown in FIGS. 12 to 16 and interference information formatted as shown in table 1 is received, the serving base station 200 selects the cluster B since the cell 4 is indicated as the most dominant interfering cell in the interference information. To select a cluster means to select the subband mapped to the cluster. At this time, the serving base station 200 can select the subband assigned to a specific mobile station in consideration of the interference mitigation scheme. Also, the serving base station 200 can select the subband in consideration of the Quality of Service (QoS) as well as the channel interference mitigations scheme.

Next, the serving base station 200 allocates the transmission resource of the weighted serve band mapped to the cooperative base station cluster to the mobile station at step 709. That is, the serving base station 200 allocates most of the resources required for the mobile station on the subband mapped to the cooperative base station cluster and performs communication with the mobile station 100 in cooperation with cooperative base stations 300 of the group of the selected cooperative base station cluster at step 711.

In the scheduling process, the serving base station 200 must consider the data rates of all the mobile stations including the mobile station 100. In order to increase the data rates of all the mobile stations connected to the serving base station 100, the serving base station 200 applies a weight to the subband mapped to the corresponding cooperative base station cluster, thereby allocating most required resources on the subband. At this time, the resource of other subband can be allocated.

Once the resource of the subband mapped to the selected cooperative base station is allocated to the mobile station 100, the serving base station 200 communicates with the mobile station 100 in cooperation with the cooperative base stations. At this time, the serving base station can apply the PMI restriction or the PMI recommendation to a specific base station or switch on and off the subband of other base station. Also, the serving base station 200 can use a nulling scheme in cooperation with other base station.

Figure 18:
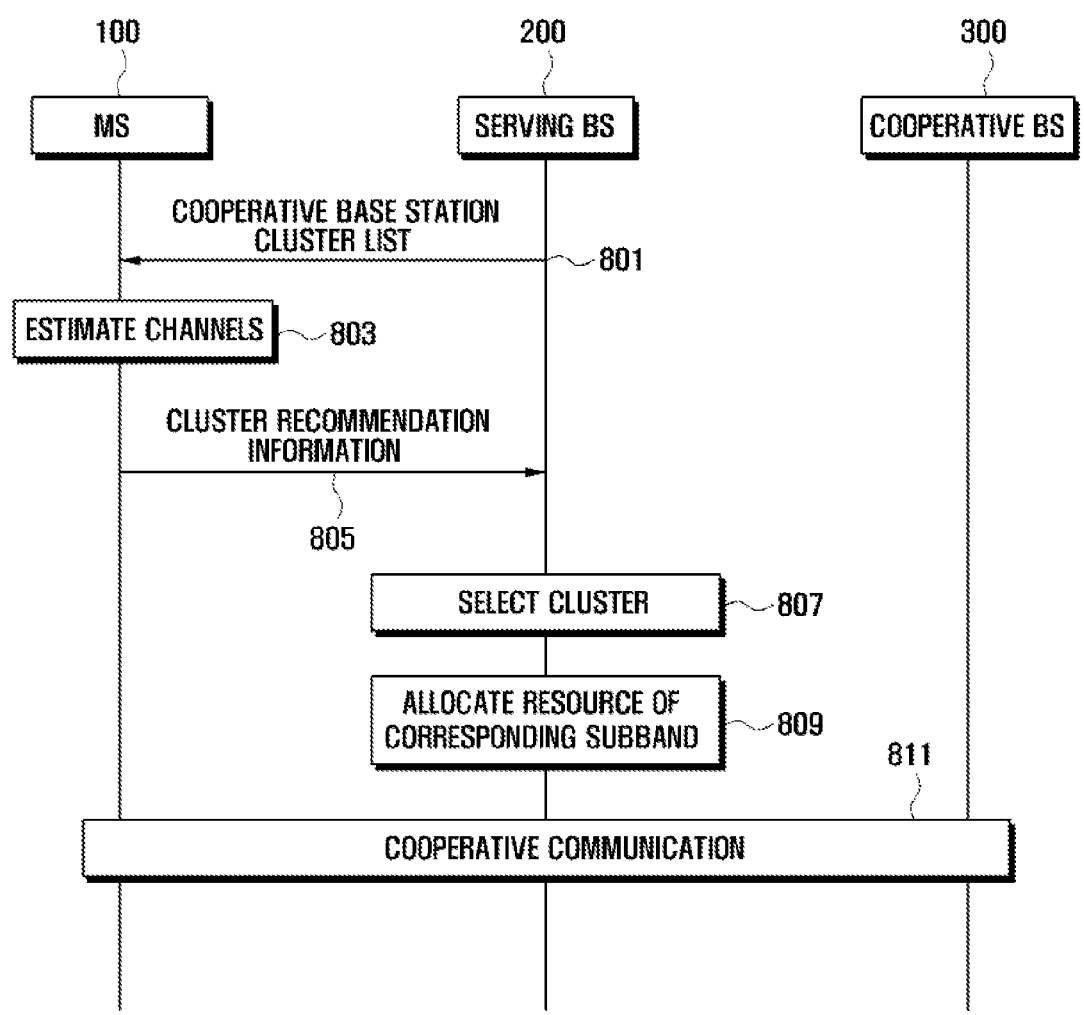
FIG. 18 is a sequence diagram illustrating operations of a mobile terminal and serving and cooperative base stations in a cluster-based cooperative communication system according to an exemplary embodiment of the present invention.

FIG. 18 is a sequence diagram illustrating operations of a mobile terminal and serving and cooperative base stations in a cluster-based cooperative communication system according to an exemplary embodiment of the present invention.

In FIG. 18, it is assumed that the downlink channel is divided into a plurality of subbands, and the subbands are mapped to corresponding cooperative base station clusters. Also, it is assumed that the base stations share the information on the cooperative base station clusters mapped to the respective subbands.

Referring to FIG. 18, a serving base station 200 sends a cooperative base station cluster list to a mobile station 100 at step 801. At this time, the cooperative base station cluster list can be broadcast in order for all the mobile stations located in the coverage area of the serving base station 200 to receive the cooperative base station cluster list.

If the cooperative base station cluster list is received, the mobile station 100 measures the radio channels of the neighbor base stations at step 803. Next, the mobile station 100 sends the measured channel condition information and cluster recommendation information generated based on the measured channel condition information to the serving base station 200 at step 805.

The cluster recommendation information indicates one of the clusters contained in the cooperative base station cluster list that is transmitted by the serving base station 200 at step 801.

That is, the mobile station 100 recommends a cluster including the cooperative base station group including both the least interfering cell (or sector) and the serving cell to the serving base station. The cluster recommendation information can be formatted as shown in table 2.

Table 2 shows exemplary cluster recommendation information for use in the exemplary embodiment of FIG. 18.

TABLE 2

| Rank | Cluster | Cooperative communication info. |
|---|---|---|
| 1 | Cluster A | Information about other BSs within the group to which the serving BS belongs in Cluster A |
| 2 | Cluster B | Information about other BSs within the group to which the serving BS belongs in Cluster B |
| 3 | ... | ... |

It is assumed that the cluster recommendation information of table 2 is transmitted and the mobile station 100 is located at the region E of cell 1 in the cluster configurations of FIGS. 12 to 16. As a result of the channel measurements at step 803, it is assumed that the cells 2, 3, 4, 5, and 6 are estimated to be potentially interfering cells. In this case, it is preferred to select one of the cluster A having a group of the cells 1, 2, 3, and 4 and the cluster B having a group of cells 1, 4, 5, and 6 to mitigate the interference effectively. Accordingly, the mobile station 100 sends the cluster recommendation information for recommending one of the clusters A and B to the serving base station 200. In a case that it is estimated that the interferences of the cells 2 and 3 are relatively severe as compared to those of the cells 5 and 6, the cluster A is ranked as the top recommended cluster.

The cluster recommendation information includes the cooperative communication information. As aforementioned, the cooperative communication information can include at least one of the channel measurement information of neighbor base stations, PMI restriction, PMI recommendation, and subband off value.

The cooperative communication information can be excluded in the cluster recommendation information. This means that the cooperative communication information is optionally transmitted along with the cluster recommendation information. The cluster recommendation information is transmitted as the long-term channel information to the serving base station, and the cooperative communication information can be transmitted whenever the cooperative base station scheme is performed.

At step 805, the mobile station 100 can transmit CQI per subband and delta CQI as the estimated channel quality enhancement amount per subband that are acquired from the measured channel information to the serving base station 200 along with the cluster recommendation information. Here, the CQI means a value indicating channel quality without interference control, and the delta CQI means a value indicating the channel quality enhancement amount expected when the interference control is applied with the cluster mapped to the corresponding subband.

If the cluster recommendation information is received, the serving base station selects one of the clusters recommended in the cluster recommendation information at step 807.

The serving base station 200 can select one of the clusters recommended in the cluster recommendation information in consideration of the channel qualities, CQIs, and delta CQIs of the subbands mapped to the recommended clusters. That is, the serving base station 200 can use the CQIs delta CQIs for selecting the most appropriate cluster.

Once the cooperative base station cluster is selected, the serving base station allocates transmission resources on the subband mapped to the selected cooperative base station cluster at step 809 and performs communication with the mobile station 100 in cooperation with cooperative base stations 300 of the group of the selected cooperative base station cluster at step 811. At this time, the serving base station 200 can apply the PMI restriction scheme or the PMI recommendation scheme in cooperation with the other base station within the cooperative base station cluster, or switch on and off the subband of other base station. Also, the serving base station 200 can perform the nulling scheme in cooperation with other base stations.

Figure 19:
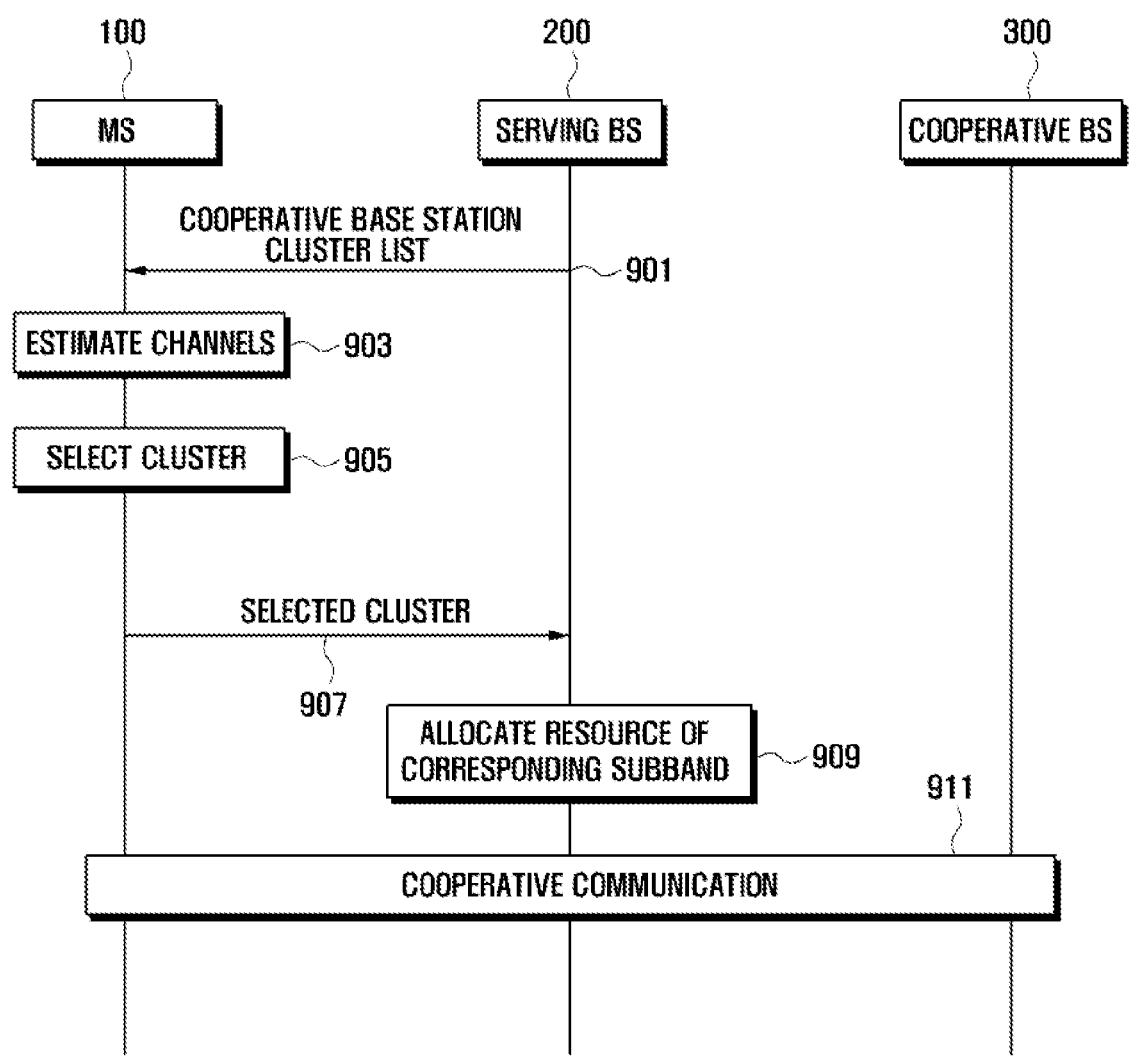
FIG. 19 is a sequence diagram illustrating operations of a mobile terminal and serving and cooperative base stations in a cluster-based cooperative communication system according to an exemplary embodiment of the present invention.

FIG. 19 is a sequence diagram illustrating operations of a mobile terminal and serving and cooperative base station in a cluster-based cooperative communication system according to an exemplary embodiment of the present invention.

In FIG. 19, it is assumed that the downlink channel is divided into a plurality of subbands, and the subbands are mapped to corresponding cooperative base station clusters. Also, it is assumed that the base stations share the information on the cooperative base station clusters mapped to the respective subbands.

Referring to FIG. 19, a serving base station 200 sends a cooperative base station cluster list to a mobile station 100 at step 901. At this time, the cooperative base station cluster list can be broadcast in order for all the mobile stations located in the coverage area of the serving base station 200 to receive the cooperative base station cluster list.

If the cooperative base station cluster list is received, the mobile station 100 measures the radio channels of the neighbor base stations at step 903. Next, the mobile station 100 selects a cooperative base station cluster which is most suitable for the channel environment estimated on the basis of the measurements at step 905. That is, the mobile station 100 selects a cluster having a group including the serving cell and the neighbor cells that interfere the most with the mobile station 100.

Next, the mobile station 100 sends the information on the selected cluster and cooperative communication information about the cooperative base stations belonging to the group including the serving base station at step 907. The cooperative communication information can include at least one of the channel measurement information of neighbor base stations, PMI restriction, PMI recommendation, and subband on/off value.

If the selected cluster information and cooperative communication information are received, the serving base station 200 allocates the resources of the subband mapped to the selected cluster at step 909 and performs communication with the mobile station 100 in cooperation with cooperative base stations 300 of the cooperative base station group of the selected cooperative base station cluster at step 911. At this time, the serving base station 200 can apply the PMI restriction scheme or the PMI recommendation scheme in cooperation with the other base station within the cooperative base station cluster, or switch on and off the subband of other base station. Also, the serving base station 200 can perform the nulling scheme in cooperation with other base stations.

Although the mobile stations estimates the channel conditions of the neighbor base station in the above described exemplary embodiments, the serving base station 200 can estimate the channel conditions between the mobile station 100 and the serving and neighbor base stations using a Sounding Reference Signal (SRS) transmitted by the mobile station 100. In this case, the serving base station 200 selects a cooperative base station having the cooperative base station group including the most interfering base stations along with the serving base station 200 and allocates resources on the subband mapped to the selected cooperative base station cluster with the addition of weight.

As described above, the cluster-based cooperative communication system and method of the present invention selects one of multiple cooperative base station clusters that has a group including the most interfering base stations along with the serving base station and allocates the resources of the subband mapped to the selected cooperative base station cluster with addition of weight, thereby effectively mitigating the interferences.

While the invention has been shown and described with reference to certain exemplary embodiments thereof, it will be understood by those skilled in the art that various changes in form and details may be made therein without departing from the spirit and scope of the invention, as defined in the appended claims and their equivalents.

What is claimed is:

1. A cluster-based cooperative communication method of a mobile station, the method comprising:
   receiving a cooperative base station cluster list;
   receiving allocation of a resource of a weighted subband mapped to a selected one of cooperative base station clusters within the received base station cluster list, the selected cooperative base station cluster having a group including a serving base station of the mobile station and dominant interfering base stations found by channel estimation; and
   communicating with the serving base station in cooperation with the dominant interfering base stations,
   wherein the receiving of the allocation of the resource comprises:
      reporting the selected cooperative base station cluster having the group including the serving base station and the dominant interfering base stations to the serving base station; and
      allocating, at the serving base station, the resource by weighting the subband mapped to the selected cooperative base station cluster to the mobile station.

2. The method of claim 1, wherein the receiving of the allocation of the resource comprises:
   selecting, at the serving base station, the selected cooperative base station cluster having the group including the serving base station and the dominant interfering base stations; and
   allocating the resource by weighting the subband mapped to the selected cooperative base station cluster.

3. A cluster-based cooperative communication method of a base station, the method comprising:
   transmitting a preset cooperative base station cluster list;
   allocating a resource of a weighted subband mapped to a selected one of the preset cooperative base station clusters to a mobile station, the selected cooperative base station cluster having a group including a serving base station of the mobile station and dominant interfering base stations found by channel estimation; and
   communicating with the mobile station in cooperation with the dominant interfering base stations,
   wherein the allocating of the resource to the weighted subband comprises:
      receiving the selected cooperative base station cluster having the group including the serving base station and the dominant interfering base stations from the mobile station; and
      allocating the resource by weighting the subband mapped to the selected cooperative base station cluster to the mobile station.

4. The method of claim 3, wherein the allocating of the resource the weighted subband comprises:
   selecting the cooperative base station cluster having the group including the serving base station and the dominant interfering base stations; and
   allocating the resource by weighting the subband mapped to the selected cooperative base station cluster.

5. A cluster-based cooperative communication system, the system comprising:
   a mobile station for receiving a cooperative base station cluster list, for receiving allocation of a resource of a weighted subband mapped to a selected one of cooperative base station clusters within the received base station cluster list, the selected cooperative base station cluster having a group including a serving base station of the mobile station, and dominant interfering base stations found by channel estimation, and for communicating with the serving base station in cooperation with the dominant interfering base stations,
   wherein the mobile station reports the selected cooperative base station cluster having the group including the serving base station and the dominant interfering base stations to the serving base station, and the base station allocates the resource by weighting the subband mapped to the selected cooperative base station cluster to the mobile station.

6. The system of claim 5, wherein the serving base station selects the cooperative base station cluster having the group including the serving base station and the dominant interfering base stations, and allocates the resource by weighting the subband mapped to the selected cooperative base station cluster.

7. A cluster-based cooperative communication system, the system comprising:
   a serving base station for transmitting a preset cooperative base station cluster list, for allocating a resource of a weighted subband mapped to a selected one of the preset cooperative base station clusters to a mobile station, the selected cooperative base station cluster having a group including a serving base station of the mobile station, and dominant interfering base stations found by channel estimation, and for communicating with the mobile station in cooperation with the dominant interfering base stations,
wherein the serving base station receives the selected cooperative base station cluster having the group including the serving base station and the dominant interfering base stations from the mobile station, and the serving base station allocates the resource by weighting the subband mapped to the selected cooperative base station cluster to the mobile station.

8. The system of claim 7, wherein the serving base station selects the cooperative base station cluster having the group including the serving base station and the dominant interfering base stations and allocates the resource by weighting the subband mapped to the selected cooperative base station cluster.

* * * * *